Figure 3:
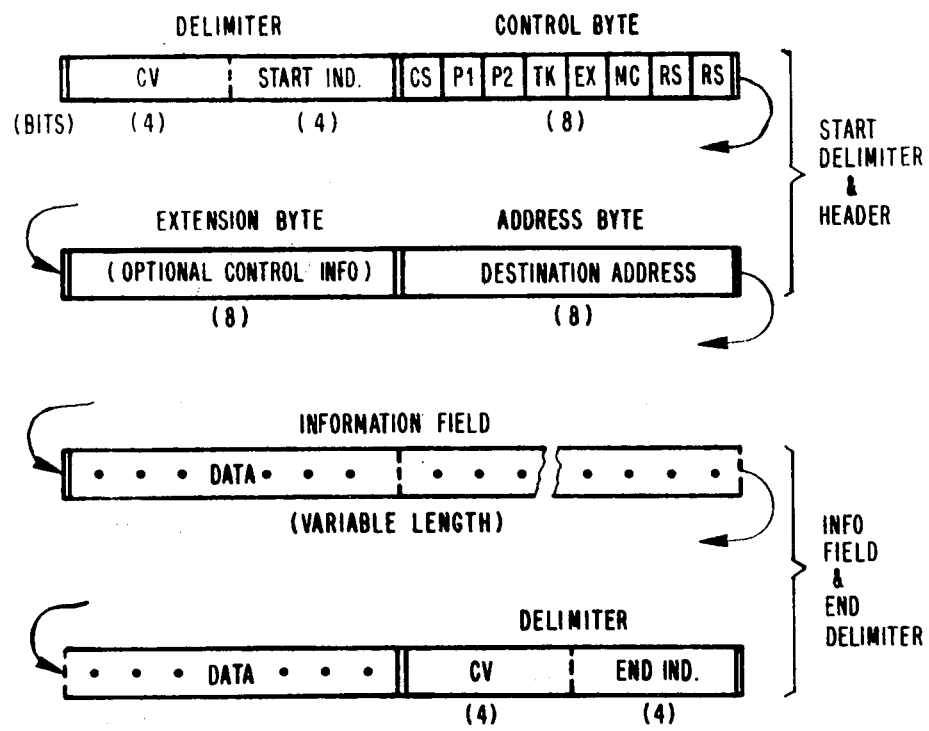

United States Patent [19]

Janson et al.

[11] Patent Number: 4,482,999
[45] Date of Patent: Nov. 13, 1984

[54] METHOD OF TRANSMITTING INFORMATION BETWEEN STATIONS ATTACHED TO A UNIDIRECTIONAL TRANSMISSION RING

[75] Inventors: Philippe A. Janson, Wadenswil; Hans R. Mueller, Langnau, both of Switzerland; Daniel T. W. Sze, Boca Raton, Fla.

[73] Assignee: International Business Machines Corporation, Armonk, N.Y.

[21] Appl. No.: 326,291

[22] Filed: Dec. 1, 1981

[30] Foreign Application Priority Data

Dec. 8, 1980 [EP] European Pat. Off. ........ 80107706.6

[51] Int. Cl.³ .............................................. H04J 6/00
[52] U.S. Cl. ......................................... 370/86; 370/60
[58] Field of Search ...................... 370/60, 86, 92, 94, 370/61

[56] References Cited

U.S. PATENT DOCUMENTS

| | | | |
|---|---|---|---|
| 3,988,545 | 10/1976 | Kuemmerle et al. | 370/60 |
| 4,078,228 | 3/1978 | Miyazaki | 370/86 |
| 4,154,983 | 5/1979 | Pederson | 370/94 |
| 4,251,880 | 2/1981 | Baugh et al. | 370/94 |
| 4,312,065 | 1/1982 | Ulug | 370/94 |

OTHER PUBLICATIONS

J. Smet et al., "Pacuit Switching Combines Two Techniques in One Network", Computer Design, vol. 15, No. 6, Jun. 1976, pp. 83–88.
B. Penny et al., "Survey of Computer Communications Loop Networks: Part 1", Computer Comm., vol. 2, No. 4, Aug. 1979, pp. 165–180.
T. Tsuda et al., "Design of a Multi-Service Subscriber Loop System", NTG-Fachber, vol. 73, 1980, pp. 114–118.
Y. Ikeda et al., "Virtual Circuit Switching System: A new System Concept for Telephony and Data Integration", ISS, May 1979.
H. Mujahara et al., "Flexible Multiplying Techniques with Two Types of Packet for Circuit and Packet Switched Traffic", Trans of the IECE of Japan, vol. E64 No. 6, Jun. 1981, pp. 390–397.
P. T. Neale, "The DEMOS Multicomputer Ring: The Ring Closer", NPL Report, Oct. 1980, pp. 1–80.

Primary Examiner—Douglas W. Olms
Assistant Examiner—Wellington Chin
Attorney, Agent, or Firm—John B. Frisone

[57] ABSTRACT

In a ring communication system comprising several stations, access to the ring is granted to one station at a time by a circulating token indication. A method is provided guaranteeing a transmission opportunity for synchronous or circuit-switched data in periodic time intervals to authorized stations. A CS monitor station issues a frame header which is marked in a specific bit position to allow only authorized stations to transmit their synchronous data together with a destination address. In a first embodiment, a single frame comprises a plurality of slots each having a free/busy indication, a destination address field and a field for synchronous data, and each authorized station can occupy one such slot. In a second embodiment, a marked frame can be used by only one authorized station for transmitting synchronous data, but a new marked frame header is reissued until all authorized stations around the ring have transmitted synchronous data.

11 Claims, 12 Drawing Figures

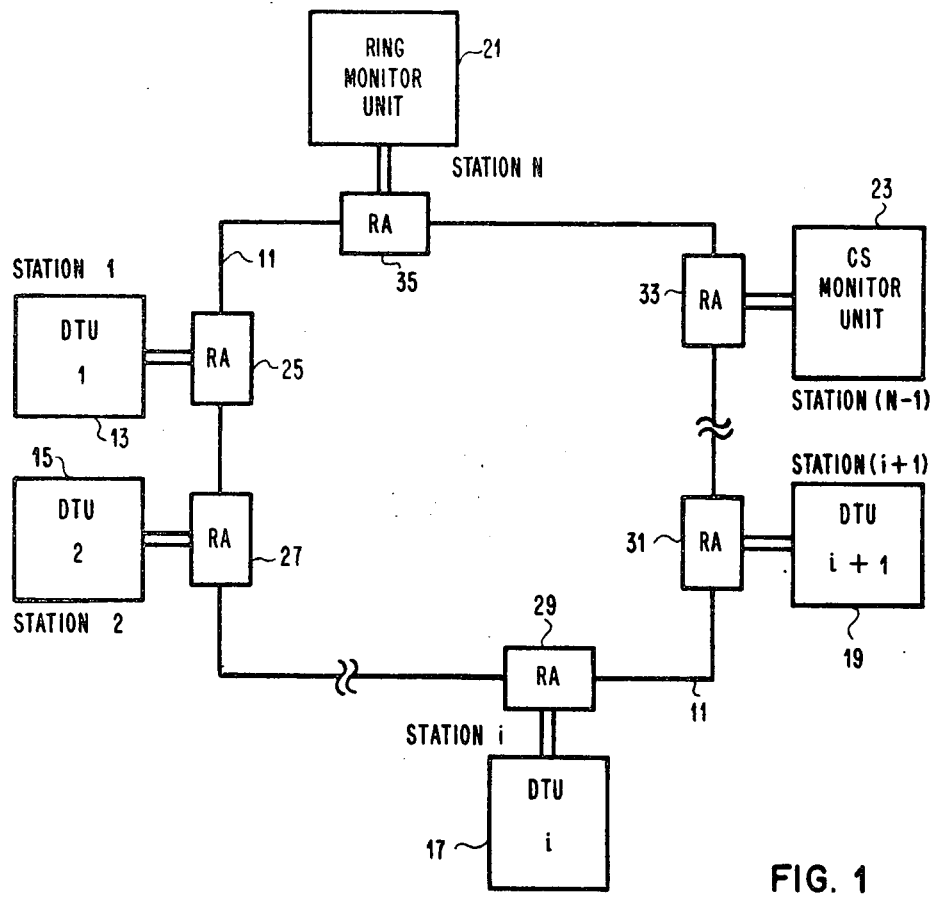
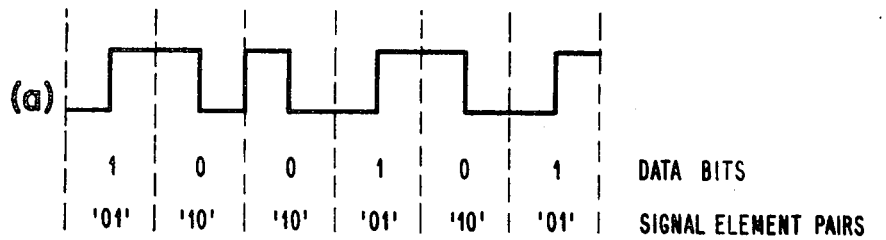
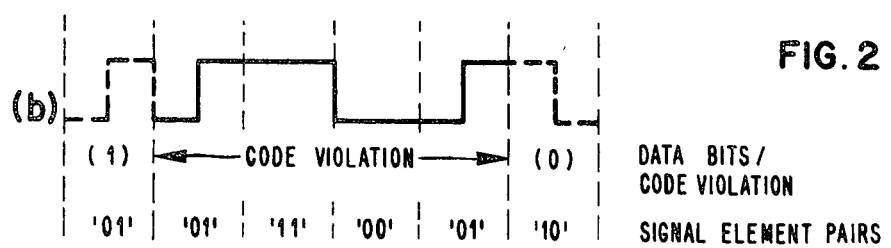
FIG. 1
FIG. 2

METHOD OF TRANSMITTING INFORMATION BETWEEN STATIONS ATTACHED TO A UNIDIRECTIONAL TRANSMISSION RING

The present invention is concerned with a method of transmitting information between stations attached to a unidirectional transmission ring, in which access to the ring for transmitting addressed information is given to stations by a circulating frame header and a token indication, without frame synchronization, and a method of exchanging asynchronous data packets as well as synchronous data blocks in frames between stations attached to a unidirectional transmission ring.

Numerous ring transmission systems are known in which asynchronously occurring data as well as synchronous information (e.g., voice samples) can be transmitted. Such systems were disclosed, among others, in following papers and patents:

P. Zafiropulo et al: "Signaling and Frame Structures in Highly decentralized Loop Systems," Proceedings ICCC 1972, pp. 309-315.

G. J. Coviello et al: "Integration of Circuit/Packet Switching by a SENET Concept," Proceedings NTC 1975, pp. 42-12 through 42-17.

U.S. Pat. No. 3,732,374: "Communication System and Method"

E. Y. Rocher et al: "Self-Switching Multi-Cable Loop," IBM Technical Disclosure Bulletin, Vol. 13, No. 8, January 1971, pp. 2422-2424.

These systems allow integration of different types of data services, but they require a fixed time raster, i.e., they are slotted systems. This has the disadvantage that all stations attached to the ring must be slot-synchronized, and that the roundtrip delay on the ring must be in a defined relation to the slot time. Special adaptation procedures are necessary when stations are inserted to, or removed from, the ring or when the ring configuration is altered in any way.

From the article, "Data Loop Architecture Using Transmit-Receive Message Pairs," by R. Abraham et al, IBM Technical Disclosure Bulletin, Vol. 19, No. 1, (June 1976), pp. 146-151, a ring communication system is known in which stations communicate with a controller using frames each carrying synchronizing information, and in which the controller generates sequences of frames which can be seized by stations when they want to transmit. The system does not enable, however, direct information exchange between peer type stations because of the controller's central role, and transmission possibility for synchronous information in regular intervals is not guaranteed.

Another ring communication system is known in which data are transmitted in frames between stations, and in which the right to transmit is conveyed from station to station by an indicator bit associated with a control byte which is converted to "busy" by a station seizing control of the ring, and which is reissued as "free" after that station has transmitted its data. This system is disclosed in a paper, "An Experimental Distributed Switching System to Handle Bursty Computer Traffic" by W. D. Farmer and E. E. Newhall, ACM Symposium on Problems in the Optimization of Data Communication Systems," Oct. 13-16, 1969. The described system is well suited for transmission of addressed data packets of variable length which are furnished at random intervals. Though the transmission of signals at a regular rate (e.g., voice) is mentioned, the paper does not disclose how the regular availability of transmission channel capacity can be provided without modifying the basic packet-switched or token-controlled type of transmission (e.g., by intervals of ordinary time-division multiplex, i.e., slotted transmission).

It is an object of the present invention to provide a method and arrangement for exchanging information between equal-ranking stations in a decentralized ring transmission system, which is based on the token control mechanism granting access to the ring to one station at a time, and which, besides giving an opportunity to transmit asynchronously furnished data packets in an efficient way between all stations, guarantees to a number of authorized stations a transmission opportunity for synchronously furnished data in regular time intervals.

It is another object to devise a loop communication method for both asynchronous and synchronous data which requires no fixed slot or frame synchronization of stations around the ring but only bit synchronization.

These objects are achieved in the invention by providing particular circuit switch monitor functions in one station, and particular bit positions in the frame header format, that allow a frame to be issued in regular intervals for serving stations requiring synchronous data transmission, without departure from the basic token-controlled transmission principle in asynchronous frames of variable length.

By the invention, transmission capacity is guaranteed in regular intervals to authorized stations with a small expense in additional circuitry.

Figure 4:
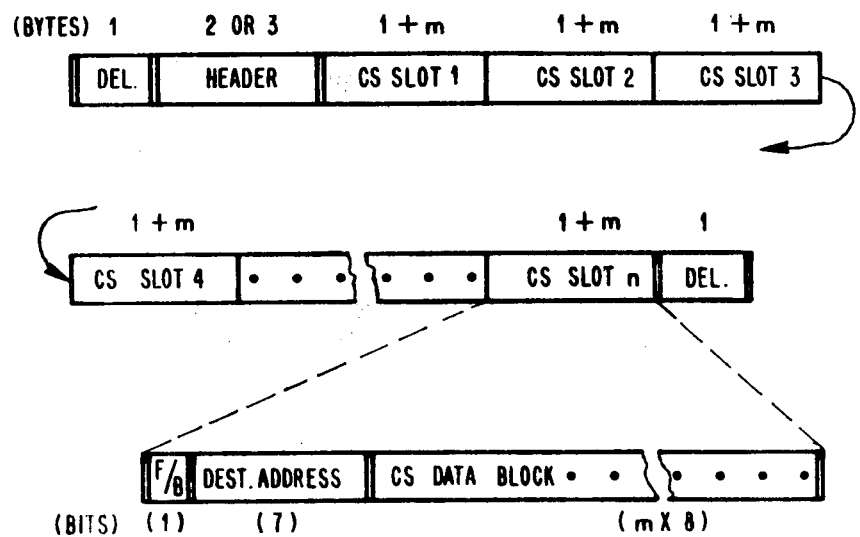
Figures 5, 6:
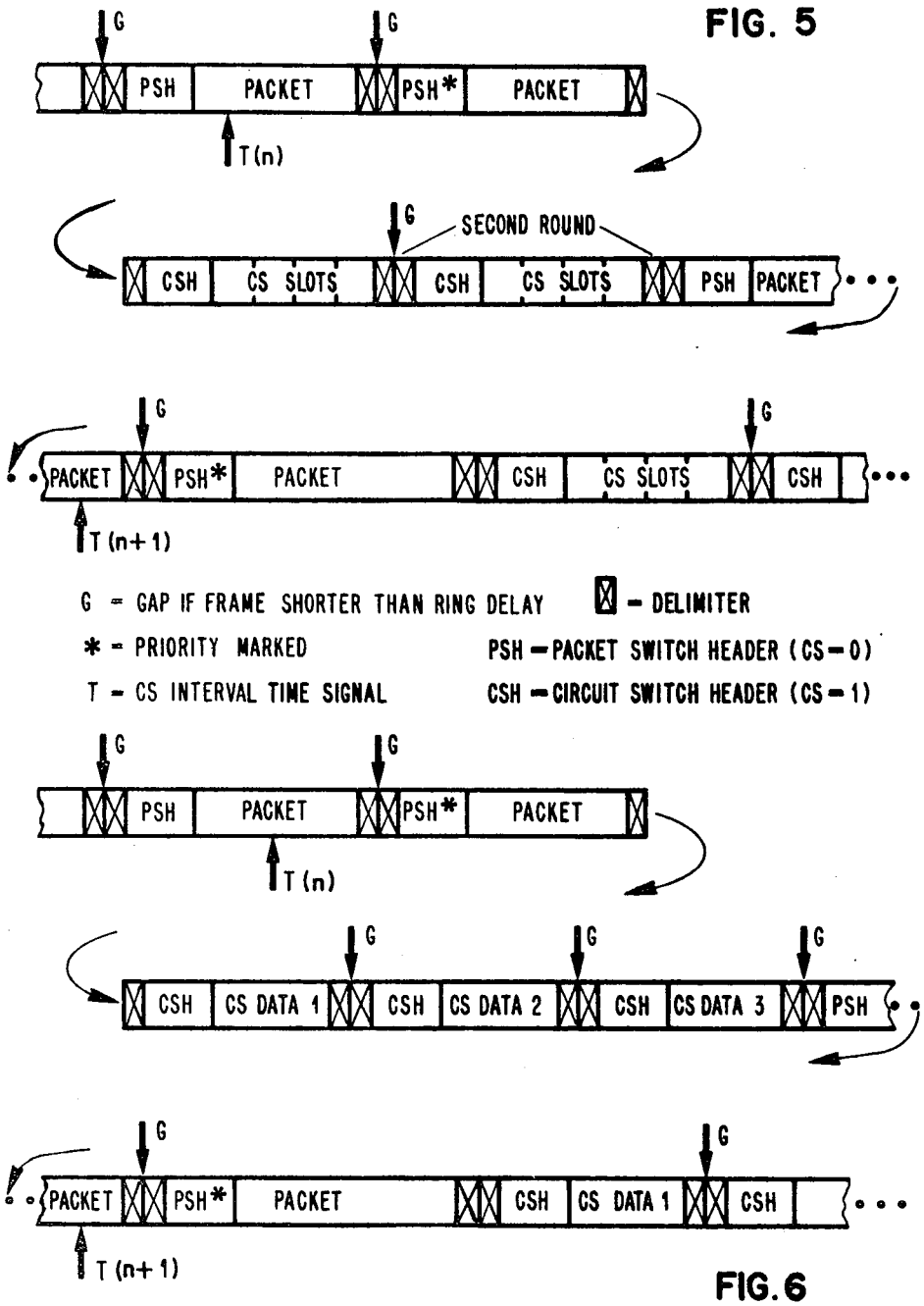
Figure 7:
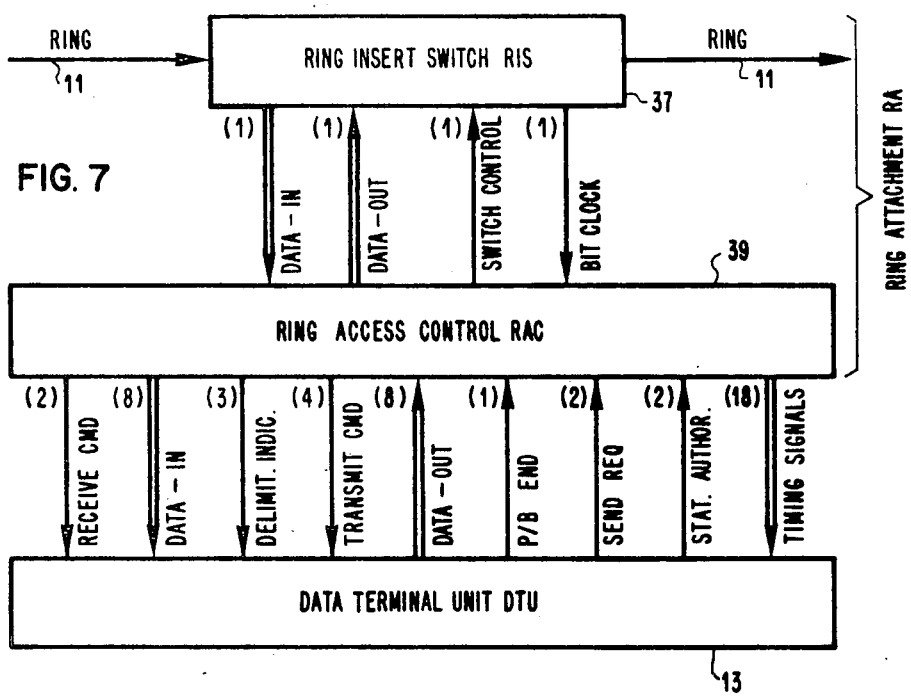
Figure 8:
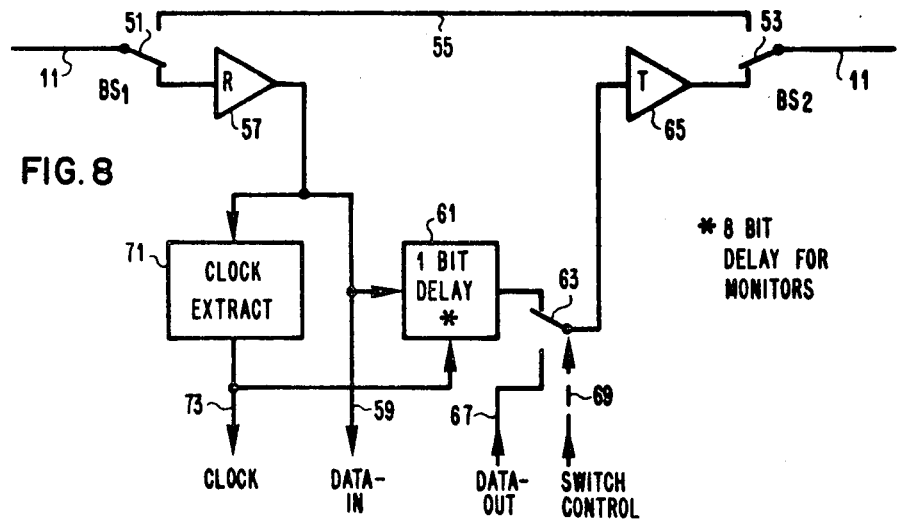
Figure 9:
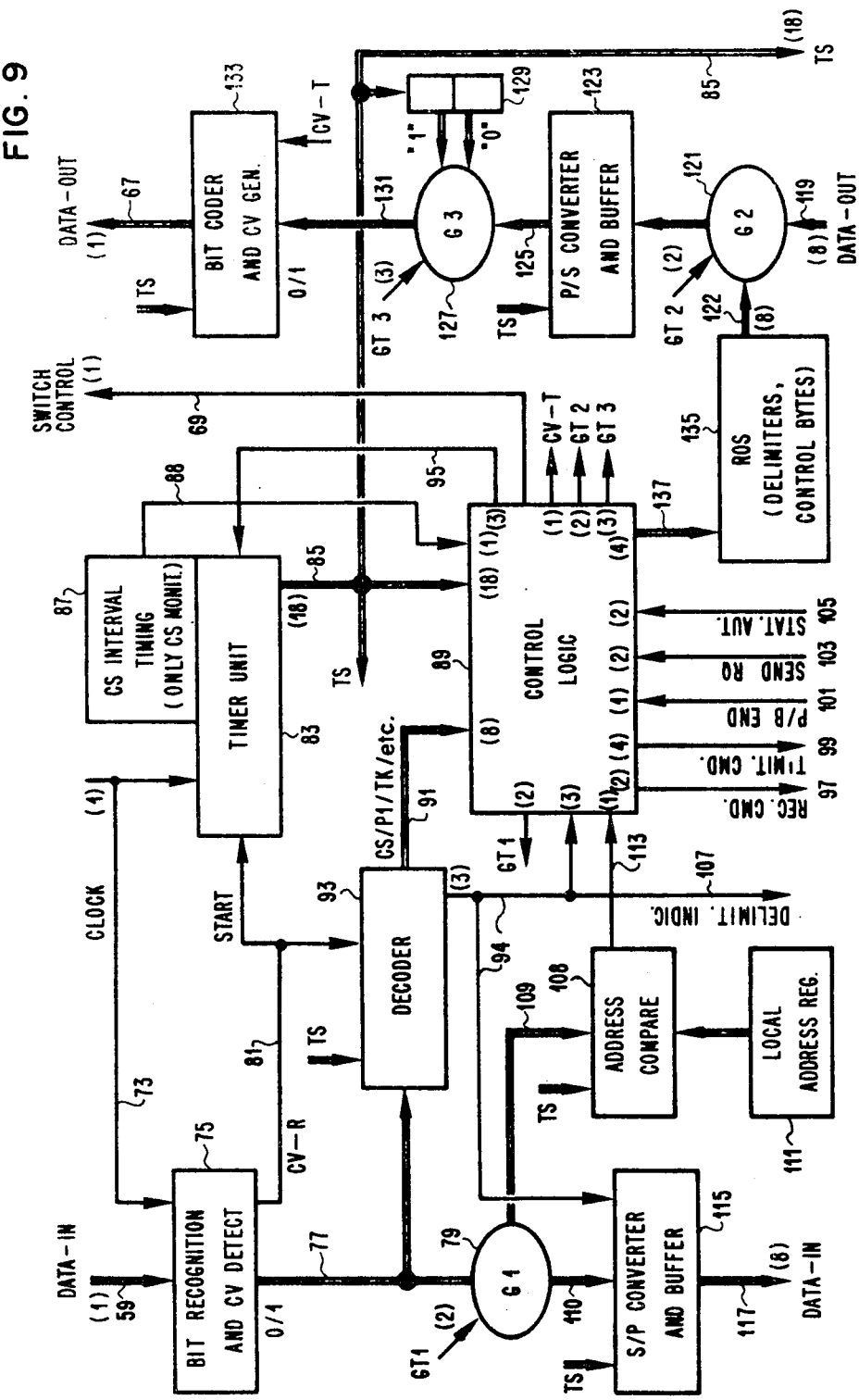
Figure 10:
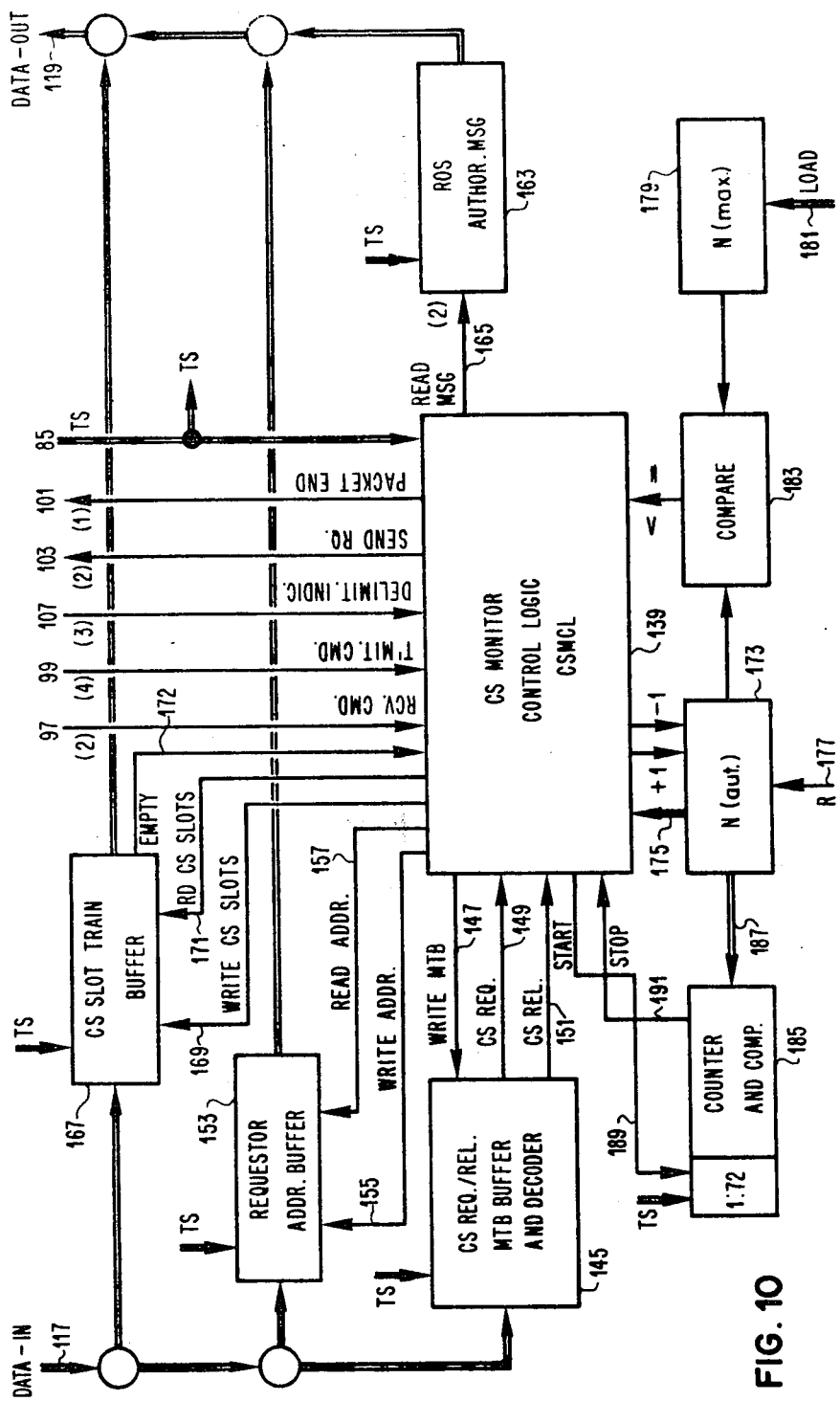
Figure 11:
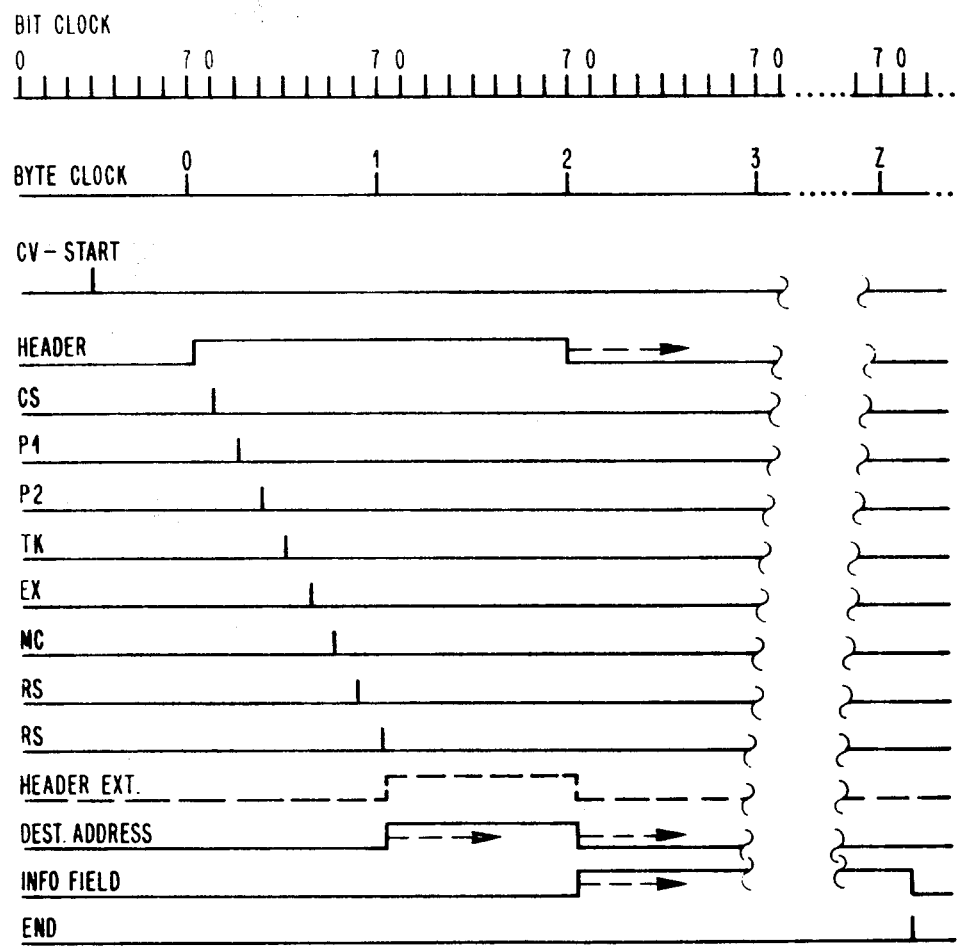
Figure 11:
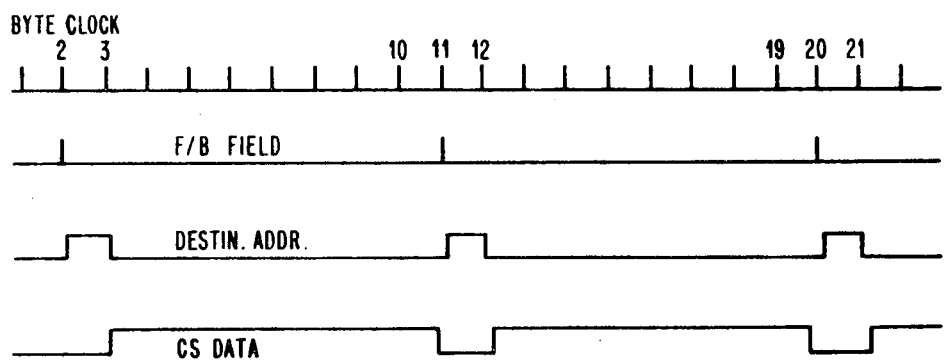

The principle of the invention, and two different embodiments will be described in the following in connection with the drawings. These drawings illustrate the following:

FIG. 1 overall block diagram of a ring communication system in which the invention finds application;

FIG. 2 waveforms used for transmission of data and for delimiting frames;

FIG. 3 basic frame format for data transmission;

FIG. 4 special frame format for transmission of synchronous data in a slot train;

FIG. 5 sequence of frames on the ring according to first embodiment providing one frame including train of CS slots;

FIG. 6 sequence of frames on the ring according to second embodiment providing a sequence of individual CS frames;

FIG. 7 block components of a station and their interface lines;

FIG. 8 block diagram of Ring Insert Switch RIS;

FIG. 9 block diagram of Ring Access Control RAC;

FIG. 10 block diagram of additional elements for a CS monitor unit;

FIGS. 11A & 11B are diagrams of timing signals TS provided in each station for handling PS frames and CS frames.

(A) ENVIRONMENT SYSTEM AND INVENTION PROCEDURE PRINCIPLES (A1) System Configuration and Transmission Principles The basic structure of the communication system in which the present invention finds application is shown in FIG. 1. It includes a closed-loop, unidirectional transmission ring 11 interconnecting a plurality of data terminal units (DTU) 13, 15, 17, 19. Each DTU may comprise one or several devices such as display terminals, minicomputers, data collectors and telephone type apparatus. The system serves for exchanging data between these devices.

The system has a ring monitor unit 21 which provides clocking, generates frame headers and does some error checking and recovery but has no central control. Thus, the communication system is decentralized, and DTUs can be independent units having equal rights (peer-type). The monitor functions may be added to a normal DTU for economy reasons, but the ring monitor can as well be a separate unit.

A further unit, the circuit switch monitor or CS monitor 23, is provided on the ring. Its purpose is to support the circuit switch functions of the present invention in the system. The CS monitor can either be combined with the basic ring monitor, or can be an additional part of a normal data terminal unit, separate from the ring monitor. In the present embodiment, the latter solution was chosen.

Each of the data terminal units and monitor units is connected to the transmission ring by a ring attachment RA 25, 27, 29, 31, 33, 35. Each data terminal unit or monitor unit, together with the associated ring attachment RA, is called a "station" in the following. Thus, stations 1 ... N are provided on the ring as shown in FIG. 1.

Each ring attachment RA includes ring insert switch circuitry RIS and ring access control circuitry RAC. Ring insert switch circuitry RIS includes switches for either connecting the station into the ring, or for bypassing the station, i.e., closing the ring without station being inserted. RIS also has repeater functions, i.e., amplification and reshaping of pulse signals, and comprises clock extraction circuitry that derives a clock signal from the received data. Each RIS further includes a delay circuit followed by a switch that is controlled from the RAC to allow either forwarding of received data with a given delay, or replacing the delayed data by data from the station. Delay in RA 25 .. . 31 for normal stations is only 1 bit; delay in RA 33 and 35 for monitors will be longer, e.g., one byte (8 bit). A few more details of ring insert switch circuits RIS and ring access control circuits RAC will be given in later sections. Any active station receives all data signals passing on ring 11, and will either repeat the received data signals, or apply its own data signals to the next section of ring 11.

Transmission of data on the ring is bit-sequential in a form that is shown in part (a) of FIG. 2 and is also known as the Manchester Code. The data signal assumes either one of two levels, and each "1" data bit is represented by a transition from low to high, each "0" data bit by a reverse transition. Thus, each data bit can be represented by a transmission signal element pair as follows:

data bit 1 = transmission signal element pair '01'
data bit 0 = transmission signal element pair '10'

For delimiting and frame recognition, a code violation corresponding to four data bits is defined, as shown in part (b) of FIG. 2. Thus, each code violation is represented by the following sequence of four signal element pairs:

code violation = pattern '01'11'00'01'

These signal representations are, of course, only one of many possible embodiments and are no prerequisite for practicing the invention.

Transmission on the ring is basically in the form of variable-length frames or packets. Normal packet frames are not periodic, i.e., the system is not slotted. Stations are only bit-synchronized to the monitor clock by the received data signal sequence.

Each station monitors all data passing around the ring, and the right to transmit data is passed around the ring from station to station by a token. A station that wants to transmit keeps the token, sends its data package (together with a destination address), and thereafter issues a new token. The token is a binary indicator in a frame header which will be explained in more detail in the next section. Due to the 1-bit delay in each normal station's ring adapter, the token bit value can be correctly recognized and changed if necessary within one bit period. The available token (TK=0) is also called a "free token indication" in the following, and a missing token (TK=1) is also called a "negative token indication." The ring monitor issues, after startup, the first frame header including a free token indication, followed by a sequence of "1" bits (i.e., signal element pairs of '01') to maintain synchronization. The monitor watches the passing of correct headers, will replace mutilated headers or, after some timeout, will replace a lost token.

(A2) Basic Frame Structure

The frame structure used in the system is shown in FIG. 3. Each frame begins with a start delimiter. This is followed by a frame header comprising a control byte, an optional header extension byte, and a destination address byte. The header is followed by a variable-length information field of given minimum and maximum length. The frame ends with an end delimiter.

Delimiters:

Delimiters have a length of eight bits of which the first four represent a code violation as explained in the previous section, and the other four are a code indicating the type of delimiter. The two most important, start and end delimiter, were already mentioned. Another important one is the abend (abnormal end) delimiter which is issued by any transmitting station detecting a severe error or malfunction. The abend delimiter may be issued any time in the middle of a frame and indicates (a) that an abnormal situation exists and must be handled by the ring monitor, and (b) that the first part of the mutilated frame is invalid.

Delimiters may have the following appearance (CV = Code Violation):

|  | CV/Indicator Bits | Signal Element Pairs |
| --- | --- | --- |
| START | CODE VIOLATION/ 1111 = | '01'11'00'01'01'01'01' |
| END | CODE VIOLATION/ 0000 = | '01'11'00'01'10'10'10'10' |
| ABEND | CODE VIOLATION/ 1010 = | '01'11'00'01'01'10'01'10' |

Control Byte:

The control byte comprises eight individual independent control bits in the following sequence and with the following meaning:

(1) CS Bit: Indicates whether the frame is a normal asynchronous PS frame (0) or a synchronous CS frame (1), as will be explained later. ( frame stands for "packet switch frame," and CS frame stands for "Circuit switch frame.")

(2) P1 Bit: This priority bit, when set to "1," prevents the issuance of a new PS frame header with free token indication by the transmitting station, to allow issuance of a CS frame header, by the CS monitor station, as will be explained later.

(3) P2 Bit: This is a second priority bit which may indicate that the frame contains a high priority system or error message. It is not used in the present embodiment.

(4) TK Bit: This is the token indication. If it is "0," the frame is not used and may be taken by the next station. If it is "1," the frame is used and must be passed down the loop unchanged (except for origin and destination station).

(5) EX Bit: This extension or modifier bit indicates, when set to "1," that the header contains an extension byte. Otherwise, the control byte will be immediately followed by a destination address.

(6) MC Bit: This monitor control bit is used to check proper operation of stations. It is set to "1" each time it passes the ring monitor and is set to "0" by the station using that frame.

(7) RS Bit: These are reserve control bits not used
(8) RS Bit: in the present embodiment.

The reserve control bits may be used for the following functions: (a) Redundant coding of important control information, e.g., representation of token by two bits instead of only one. (b) Indication of the form of data representation in the information field, e.g., whether bit or word (byte) oriented; or whether user data or system data.

Extension Byte:

The extension byte is an optional byte in the frame header which can be added by any transmitting station after setting the EX bit in the control byte. It may contain the following information:

In asynchronous PS frames: A specification of the data format used in the information field, or an extension of the destination address. In synchronous CS frames: A value indicating the number of existing CS connections, or a value indicating the block length for the data blocks transferred in CS frames.

When the extension byte is to be used in a system, a respective code or the meaning of individual bits will have to be specified in advance.

Address Byte:

This 8-bit field contains the address of the destination station for the message in the respective frame. One or more addresses may be used as broadcast or group addresses. Usually, 8 bits will be sufficient to address all stations attached to the ring.

If more addresses are required, two alternatives are possible. The extension byte could be used for an address extension, or the system would have to be designed to provide two address bytes in each header.

Information Field:

This field will contain the data or message actually to be transmitted. It may have any length up to a given maximum (e.g., 8×256 bits). No current length has to be specified because the information field is followed by a delimiter.

In principle, there should be no format or code restriction so that any bit string could be inserted in the information field. This would allow, e.g., the transmission of complete SDLC frames from one station to another (which stations might be interfaces to other networks than the present ring system). Thus, the meaning of the data would have to be agreed upon between the respective stations, or a format specification would have to be given in the extension byte as indicated above.

In the present embodiment, however, the information field is selected to be byte-oriented, each byte comprising eight bits. The number of bytes in the information field may be up to 256 bytes in this example.

(A3) Transmission of Data Packets in Asynchronous Frames

Initially, the ring monitor releases a start delimiter, a frame header containing all zeros (i.e., '10' signal element pairs) in the control byte and in the address byte, followed by a sequence of ones (i.e., '01' signal element pairs). Thus, the frame header contains a free token indication because the TK bit is "0."

Each station on the ring monitors the incoming signals for the start delimiter, and then counts header bits and bytes. If it has data to transmit, it will convert the token bit (TK bit) which was "0" in an empty frame to "1," insert the destination address after the control byte, and transmit its data followed by an end delimiter. Thereafter, if it has received its own header unaltered, it will issue a new start delimiter and a new frame header with a free token indication (TK=0) to the ring. It will then transmit all "1"s until it receives back its own end delimiter.

In the event the transmitted frame is shorter than the ring roundtrip delay and it has not received its own header, the station will, after transmitting its data packet followed by an end delimiter, send all "1"s to maintain synchronization and it will watch for its own frame header to return. When received unaltered, it will issue a new start delimiter and frame header with a free token indication so that the next station ready for transmission can seize control. In both cases it will stop transmitting idling "1"s when it receives its own end delimiter.

Each transmitting unit will check certain control bits when it receives back its own frame header. The MC bit is checked to ensure proper operation of ring system and ring monitor (as was briefly mentioned above). The P1 bit is checked to prevent issuance of a new free PS frame header by the respective unit, if the old header was priority marked by the CS monitor, an allowed alteration of the header, during its circulation around the ring, to allow the CS monitor station to issue a CS frame header (as will be explained later in more detail).

A station ready to transmit which receives a frame header with a negative token indicator (i.e., TK=1) must, of course, keep its data packet and wait until the next available frame header (with TK=0) arrives.

Any active station on the ring, after receiving the start delimiter and beginning to count header bits and bytes, will test whether TK=1, i.e., whether the frame was occupied by a station that inserted a data packet. If this test was positive, it will test whether the address field contains its own station address, or a broadcast address. (Note that if control bit EX=1, there will be an extension field in the header that must also be evaluated, and the address field will only be the third header byte). If the address comparison test is positive, the respective station is the destination and will copy the information field, i.e., the data between address field and end delimiter, into its buffer.

(A4) Transmission of Synchronous or Periodic Data Blocks

The transmission procedure described in the previous section handles only asynchronous data in a packet switching mode, i.e., data packets have to be buffered for an unknown time interval until there is a transmission possibility.

The invention to be described now allows the transmission of synchronous or periodic data in a circuit-switching mode, despite the fact that the basic system is not slotted and has no frame synchronization. The only amendments that are required for the basic token (packet switch) ring system are: A circuit switch monitor unit (block 23 in FIG. 1), or a corresponding addition to the ring monitor; a minimum of additional circuitry in each station to recognize CS control information and to handle CS data blocks (to be described later); and an appropriate frame header format, as described already in Section A(2).

The principle of the circuit-switching procedure is as follows: The CS monitor releases, in regular intervals, a particularly marked frame header (control bit CS=1) enabling each authorized station to transmit a block of periodic data, together with its destination address.

The CS frame intervals may be a multiple of the period of the synchronous data, as will be seen from the following example: For voice signals, a PCM sample must be transmitted every T=125 μs to achieve the required 8 kHz sampling rate (4 kHz bandwidth). To reduce the number of necessary CS frames, such a frame will be released only in intervals of $m \times 125$ μs=1 ms. This requires the collection of eight PCM samples into one block at the sending station, and the buffering of such block at the destination station which must release one PCM sample of the block every 125 μs. This procedure will further introduce a delay of 1 ms plus transmission time, which is acceptable, however, in most applications. Of course, any other base period T and any other blocking factor m may be chosen in a system, e.g., for real time transmission of measuring values or of process control data.

To allow release of CS frames at appropriate times without interrupting a normal, asynchronous PS frame, the CS monitor station will set the priority bit (control bit P1) in a passing PS frame header after the beginning of each CS interval which is marked by a respective "CS interval time" pulse. This priority bit will prevent the station using the respective frame to issue a new PS frame header with a "free frame" token indication (TK=0), as it would normally do. Instead, the respective station will start transmitting idle "1" bits after appending an end delimiter to its data packet (or will continue to transmit "1" bits if its packet was shorter than the ring transmission delay). The CS monitor station will then, after recognizing the end delimiter of the current PS frame, immediately issue a start delimiter and a CS frame header (just replacing the idling 1 bits it receives).

Thus, one CS frame header is released by the CS monitor station during each CS interval. The release is initiated by a CS timing pulse, but is delayed for the duration of at most two PS frames (plus ring roundtrip delay). The CS monitor must wait, after the timing pulse, until the next PS frame header arrives for priority marking, and then if TK=1, i.e., if data are presently transmitted on the ring, it must wait during one full PS frame interval for the end delimiter of the current PS frame, before it can transmit the CS frame header. If, however, the PS frame header in which the CS monitor tries to set the P1 bit is free (TK=0), it can be replaced immediately by a CS frame header. In this case, the delay between "CS interval time" pulse and release of the CS frame header is at most the time required for one frame (plus ring roundtrip delay).

The time interval between the release of two CS frame headers will not exactly be one CS period, but the variation will never be more than two PS frame intervals (plus ring roundtrip delay).

In the system, the variation will be small compared to the total duration of each CS time interval. The effect of these varations will not be noticeable by devices attached to stations, because they buffer anyway a plurality of several successive samples to compile a CS data block, and in the receiver samples will be released from a stored CS data block in successive sampling periods.

Further actions after release of a CS frame header will be described in subsequent parts of this section. As, however, only currently authorized stations are involved in these actions, the method of station authorization will be briefly explained here.

The station authorization procedure goes as follows: Only part of the total transmission time, up to a maximum, must be used for circuit-switched transmission to leave enough transmission capacity for packet-switched or asynchronous transmission. Thus, only a maximum number of CS "connections" should exist at any time, which means that only a corresponding maximum number of stations must be authorized to transmit CS data blocks.

The CS monitor unit will store this maximum number N(max) and the number N(aut) of stations currently authorized. Any station desiring to transmit periodic data must send a request to the CS monitor unit in a normal PS frame. The CS monitor will update N(aut) and send an authorizing response to the requestor. If, however, N(aut)=N(max) already, a negative response will be sent. When an authorized station will not need the CS transmission authorization any more, if must send a release message to the CS monitor unit which then will reduce N(aut) by one unit.

It must be noted that, except for keeping the current number of authorized stations N(aut), no information identifying authorized stations, or on existing CS connections, need be stored anywhere because CS data blocks are transmitted together with their destination address. If desirable, a table of existing "connections" could of course be stored somewhere, e.g., in the CS monitor unit. But no access to such table is necessary for each CS data block transfer.

For the present embodiment, it is assumed that CS data blocks have a constant length (8 bytes), and that the basic CS period T (125 μs) and blocking factor m (8) are fixed for the given system. More flexible solutions are possible, however. The CS data block length could be varied, with a length indication given in the CS frame header, as previously indicated in an earlier section. On the other hand, different CS bandwidth could be given to individual stations, based, e.g., on a basic capacity B of one byte per CS frame period. Each station would then have to request any multiple of B (up to a maximum), and would correspondingly be authorized by the CS monitor unit.

Two somewhat different embodiments of the basic invention will be described in the following. The first provides a train of n CS slots in one CS frame, the second uses n consecutive CS frames, each one for transmission between a single pair of stations.

(1) First Embodiment: Train of CS Slots

In a first embodiment, the CS Monitor station issues in regular intervals, e.g., every milisecond (1 ms=8×125 μs) a CS frame header (after a start delimiter) in which only control bit CS=1 and all other bits including the destination address are zero. This header will be followed by a train of n CS slots as shown in FIG. 4. This train is followed by an end delimiter. The number n is equal to the number of currently authorized stations. Each CS slot will comprise the following fields, as illustrated in FIG. 4:

A 1-byte address field. Its leading bit position is used as free/busy indicator or token. The other seven bit positions are used for a destination address.

An m-byte data block field. In the present embodiment, m=8. Thus, the data block field comprises 8 bytes or 64 bits.

The CS monitor station does, of course, not release any specific data bits between the CS frame header and the end delimiter. Rather, it transmits a sequence of n×9×8 "0"-bits, i.e., n empty CS slots of nine bytes each.

Each station that was authorized to transmit CS data and has compiled an 8-byte CS data block in its buffer waits for a CS frame header to arrive on the transmission ring. When it has recognized that CS=1 in a frame header, it will, starting with the frame header's end (i.e. two bytes after the start delimiter) count 9-byte slots and check the first bit of each slot, i.e., the token bit, or free/busy bit (F/B bit). When a FREE indication (F/B=0) is encountered, the slot will be seized by converting the F/B bit to "1." A destination address is inserted into the remainder of the first byte, and the buffered CS data block into the other eight bytes of the slot. Thus, during one circulation of the CS frame around the ring, each of the n authorized stations will have the opportunity to transmit one CS data block.

Any station on the ring that expects to receive CS data (e.g., because it had previously been notified) will also wait for a CS frame to arrive. It will then, by appropriate timing or counting operations, distinguish the address fields in consecutive CS slots until appearance of an end delimiter, and check whether the contents of any address field (lower seven bits) matches its own address. If it recognizes its station address, it will copy the data block from the following eight bytes into its receive buffer.

The CS frame has to pass around the ring twice to ensure that each data block transmitted by a sending station will reach its destination (which may be located upstream of the sending station). The CS frame, after its first transmission around the ring, will be buffered in the CS monitor unit. Only when the end delimiter is transmitted, the header will be released again for the second round. When the CS monitor transmitted the end delimiter of the CS frame for the second time, it will immediately release a normal asynchronous PS frame header with a free token indication (TK=0) so that normal packet-switched operation can be resumed on the loop. (No buffering if frame is shorter than ring delay.)

The resulting sequence of PS (asynchronous) frames and CS (synchronous) frames is schematically shown in FIG. 5.

To avoid a preference of the first normal station on the ring after the CS monitor (it would always be the first to receive an available PS frame header after a CS frame), some specific procedure could be introduced that would mark the new PS frame header until it passed the station that transmitted the last PS frame, so that only a station further downstream could seize this first PS frame header after CS transmission. To simplify the description, however, no such specific procedure is provided for the presently described embodiment.

Duplex Operation:

In the above description, transmission of CS data was only considered from a sender to a destination. The CS data block would remain in its slot in the CS frame and return to the originator (sender), and would then be erased.

Duplex communication of CS data can easily be achieved, however. In this case, one distinguishes in each two-station "connection" between a calling station, which will be an authorized station, and a called station. The calling station will transmit its CS data block in the first round of the CS frame, as described above, inserting the called station's address as destination address. The called station will, in turn, after recognizing its own address not only copy the 8-byte data block from the respective CS slot, but also insert its own prepared CS data block which is waiting in a transmit buffer, into the same CS slot. This exchange of received and transmitted data in the same CS slot is possible with a one-bit delay in each station. The destination address, i.e., the called station's address, will not be changed. These operations in the called station will happen any time during the first or the second round of the CS frame, depending on the relative position between calling and called station.

Each calling (i.e. authorized) station will watch, after receiving the CS frame header a second time, for the CS slot which contains the address of its partner station, i.e., for the destination address which itself inserted previously. Upon detecting this address, it will copy the 8-byte data block which must be the one transmitted by the called station, into its receive buffer. Thus, complete duplex circuit-switched communication is possible in an efficient way, using only one slot of a CS frame.

(2) Second Embodiment: Sequence of Individual CS Frames (FIG. 6)

In a second embodiment, the CS monitor station also issues a CS frame header (preceded by a start delimiter) in regular intervals, e.g., every millisecond (8×125 μs). In contrast to the first embodiment, however, the CS frame will be used only by one of the authorized stations to insert a destination address, its CS data block and an end delimiter. There will be no train of CS slots, but only one information field for one CS data block. The whole CS frame will be seized by one station by converting the token control bit (TK bit) to "1". After one circulation of the frame around the ring, the respective station will reissue the CS frame header (preceded by a start delimiter) with a free token indication (TK=0), followed by a sequence of "1" bits. Thus, the next authorized station downstream the ring can seize the CS frame for its CS data block.

This procedure will result in n consecutive CS frames, each used by a different one of the authorized stations. The CS monitor station will check all passing CS frame headers, and will finally detect one with a free token indication (TK=0) because all authorized stations had been served once. Thereupon, the CS monitor station issues a start delimiter and a PS header (i.e., a header in which the CS bit is "0") to resume normal asynchronous packet switched operation. The resulting sequence of PS and CS headers is illustrated schematically in FIG. 6.

The described procedure of the second embodiment has the advantage that, except for the authorization procedure for transmitting CS data, and the watching of the CS bit and the priority bit in the frame header, it is identical to the normal asynchronous packet switching procedure on the ring, and requires a minimum of additional hardware in normal stations. Even the CS monitor station may be simpler because no buffering of a CS frame between the first and second round, and slot timing in a CS frame is required. Another advantage is the possibility of having a different CS data block size for each station and for each CS period. Furthermore, if occasionally an authorized station had no CS data block to transmit in one CS period, no CS frame header and no transmission capacity would be used by it despite the fact that it is guaranteed a periodic transmission opportunity.

It should be noted, however, that with respect to the first embodiment, the second will require a larger fraction of the total transmission time because of the multiple CS frame headers.

Alternative:

As an alternative of the second embodiment, a procedure can be provided in which any authorized station, after transmitting its CS data block and appending an end delimiter, immediately issues a new start delimiter and CS frame header with a free token indication for use by the next authorized station. This will result in an increased utilization of transmission capacity, and shorter durations of the time intervals used for transmission of periodic circuit-switched information, but only if individual CS frames are shorter than the total transmission delay on the ring. In other words, the alternative is only useful if short CS data blocks are transmitted.

Duplex Operation:

The second embodiment is also well suited for duplex transmission. One has to distinguish between calling (authorized) stations and called stations. Each calling station, when seizing a CS frame, inserts the destination address and its CS data block. Each called station, when recognizing its own address, will copy the following CS data block into its receive buffer and instead insert a CS data block from its transmit buffer into the same frame without changing the destination address. The calling station will copy the CS data block when recognizing the destination address it used previously in a CS frame. In duplex operation, CS data blocks of both partners in a "connection" must be of equal length, of course.

(B) CIRCUIT DETAILS OF RING ATTACHMENTS AND CS MONITOR

(B1) Ring Attachment and Station Functions and Interfaces

FIG. 7 schematically shows the units and interface lines for attaching a Data Terminal Unit DTU (such as unit 13 of FIG. 1) to the transmission ring (ring 11 in FIG. 1). The ring attachment RA (e.g. box 25 in FIG. 1) comprises two basic units, as was already shortly described in an earlier section: Ring Insert Switch circuitry RIS (37), and Ring Access Control circuitry RAC (39).

The functions of RIS (37), RAC (39) and the unit DTU (13) are listed in the following part of this section. Details of the Ring Insert Switch (37) will be explained in section B2 in connection with FIG. 8, and details of the Ring Access Control (39) will be explained in section B3 in connection with FIG. 9. The Data Terminal Unit DTU will be sufficiently described by its interface lines and functional capabilities. No further details need be explained because the essential elements for implementing the present invention will be comprised in the RIS and RAC unit of the ring attachment.

Additional functions of the RAC in ring attachement 33 for the CS monitor, and of the CS Monitor Unit 23, which are required for implementing the invention, will be described in Section B4 in connection with FIG. 10 which shows the necessary details.

Interface Lines:

Between Ring Insert Switch 37 and Ring Access Control 39, the following interface lines are provided as shown in FIG. 7:

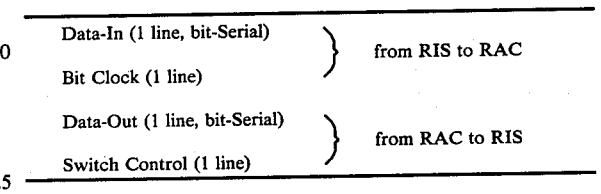

Between Ring Access Control 39 and Data Terminal Unit 13, the following interface lines are provided as shown in FIG. 7:

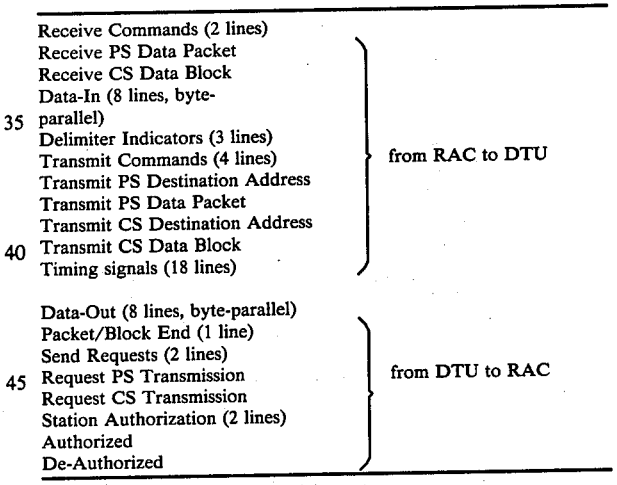

More details about the data, commands, and control signals to be transferred over these lines will be given in subsequent sections.

Functions of Ring Insert Switch RIS

Bypass sation (ring closed) OR connect ring attachment and station to ring (station inserted)
Receive signals from, and transmit signals to ring
Transfer received data signal to RAC
Derive bit clock from received data signal, and provide clock signal to RAC
Delay received data stream for 1 bit period (clocked 1-bit buffer)
  For Ring Monitor and CS Monitor, delay is 8 bits (1 byte) instead of 1 bit
Pass on received and delayed data stream, OR transfer data from DTU/RAC, to the ring through transmitter.

Functions of Ring Access Control RAC

Recognize delimiters (Start, End, Abend) in received data stream, and provide respective delimiter indicator signals to DTU Convert data from Manchester Code (used on ring) to binary code (used in DTU) and vice versa Deserialize incoming data stream and serialize outgoing data stream; buffer one incoming byte and one outgoing byte Distinguish frame header bytes and control bits; distinguish information field in frames, and bytes within information field;

Distinguish CS slots, and fields for F/B bit, destination address, and data block within CS slots (*1);

Generate respective timing/control signals for RAC internal use and for the DTU

Test frame header control bits (CS, P1, P2, TK, etc.) and generate respective control signals Invert token bit (TK or F/B bit) if "send request" from DTU is active Generate switch control signal for RIS Transfer incoming data from RIS to DTU and outgoing data from DTU to RIS Generate "transmit" command to station after seizing a frame, or after seizing a CS slot (*1)

Compare destination address to own station address (and to broadcast address)

Generate "receive" command to station if address matches

Transmit END delimiter after end of data transmission

Transmit ABEND delimiter to canel current frame in case of severe error

Transmit new PS header (preceded by a start delimiter); or transmit new CS header (preceded by a start delimiter) (*2)

at appropriate time, EITHER after transmitting END delimiter, OR when receiving back own frame header (whichever is later). No new PS frame header must be released, however, if priority bit P1 is set in the returning own frame header.

Transmit idling "1"-Bits to maintain synchronization after transmitting an END delimiter of a frame with a SET priority bit (P1) in its header after transmitting an END delimiter of any frame until its frame header is received back by the same station NOTE: The marks (*1) and (*2) appearing in this section have the following meaning: (*1)=This function is only provided for the first embodiment, i.e., the CS slot train solution; (*2)=This function is only provided for the second embodiment, i.e., the solution with a sequence of individual CS frames

Additional Functions of CS Monitor Station: In RAC

Generate timing signals for periodic CS intervals ("CS interval time" pulse)

Set priority bit (P1) in first passing frame header with TK=1 after each CS interval time pulse Issue a CS frame header (preceded by a start delimiter) when END delimiter of current frame is received, or when frame header with TK=0 is received, or when frame header with TK=0 is received after CS interval time pulse Count $(1+m) \times 8 \times N(aut)$ CS slots, then transmit END delimiter Transmit "0"-bits between frame header and END delimiter (*1)

Transmit sequence of "1"-bits after frame header (*2)

Issue new PS frame header (preceded by a start delimiter)

when CS header is received back second time, i.e., at end of second round of CS slot train (*1)

when a CS header is received with a free token bit (TK=0) (*2)

In CS Monitor Unit

Maintain values N (max) and N (aut)

Accept CS request message

Compare N(max) and N(aut); increase N(aut) if it is still less than N(max), and transmit grant message (addressed to requesting station); transmit negative message if N(aut)=N(max) already Accept CS release message and decrease N(aut)

Buffer the header and a portion of the CS slot train after first round before retransmitting CS frame header and CS slot train again for second round (*1)

Functions of Data Terminal Unit DTU

Note: only those functions are listed that are relevant to information exchange between Data Terminal Unit DTU and Ring Access Control RAC, for PS data packets and CS data blocks Buffer outgoing PS data packet Buffer outgoing CS data block Buffer PS destination address Buffer CS destination address Furnish buffered information byte-sequential upon receiving respective "Transmit" command signal from RAC Buffer incoming PS data packet Buffer incoming CS data block Write respective information into buffer upon receiving "receive" command signal from RAC Send CS authorization request message to CS monitor Receive CS authorization grant message from CS monitor Send CS authorization release message to CS monitor Transmit CS authorization signal to RAC; transmit CS deauthorization signal to RAC Activate PS send request signal to RAC; activate CS send request signal to RAC.

(B2) Details of Ring Insert Switch RIS

FIG. 8 shows details of Ring Insert Switch Circuitry RIS (block 37 in FIG. 7). It comprises two bypass switches BS1 (51) and BS2 (53) which can directly interconnect the incoming and the outgoing branch of transmission ring 11 by a bypass branch 55. Switches 51 and 53 may be manual switches which are set to one or the other of two possible positions by a key. They could, however, as well be electrically controlled, remotely or locally.

Switch 51, in its second position, connects incoming ring branch 11 to a signal receiver 57. Output line 59 of this receiver is the DATA-IN line shown in FIG. 7 for transferring data to RAC. Line 59 is also connected to the input of a 1-bit delay unit 61 (clocked single bit buffer). As mentioned earlier, in RIS units for monitor stations, unit 61 has a capacity of 8 bit (8 bit delay). The output of delay unit 61 can be connected by another two-position switch 63 to transmitter 65. The output of this transmitter can be connected by the second position of switch 53 to the outgoing branch of ring 11.

The second position of switch 63 is connected to line 67 which is the DATA-OUT line from RAC as shown in FIG. 7. The setting of switch 63 is controlled by a signal on line 69 from RAC.

Clock extraction circuitry 71 is also connected to DATA-IN line 59. It derives a bit clock from the received signal pattern and furnishes this clock signal on line 73 to RAC (Ring Access Control 39). Clock line 73 is also connected to delay unit 61.

(B3) Details of Ring Access Control RAC

FIG. 9 is a detailed block diagram of Ring Access Control Circuitry 39.

A bit recognition and code violation detect unit 75 is connected to DATA-IN line 59 and to bit clock line 73. On its output line 77, it furnishes a signal representing a "0"-bit when a signal element pair '10' was received, and representing a "1"-bit when a signal element pair '01' was received. These bit signals can be forwarded through gating circuitry G1 (79) to utilizing circuitry and to the DTU, as will be described later.

If, however, a code violation '01'11'00'01' is recognized by unit 75, a control pulse is furnished on line 81 for starting a timer unit 83. Timer 83 also receives bit clock signals from line 73, and provides all the necessary timing signals on lines 85 to several other functional units. The timer unit comprises counters and logic gates. The generated timing signals are shown and explained in a separate section and figure (Section B5 and FIG. 11).

An extension to timer unit 83, the CS interval timer 87, having a timing signal output line 88, need only be provided in an RAC for the CS monitor. It will be explained in Section B4.

Control logic 89 is provided for generating several control signals in response to timing and indicator signals which it receives on its input lines. This unit will not be shown in more detail. Rather, its logic functions will be explained which can easily be implemented by someone skilled in the art, using logic circuitry including latches and counters.

Eight control bit lines 91 furnish to control logic 89 the individual binary values of the control bits (e.g. CS/P1/TK, etc.) received in a frame header. Decoder 93 gates these bit values from receive line 77 to the eight separate lines 91 under control of distinguishing signals which are furnished on lines TS during receipt of a control byte.

Decoder 93 also receives the code violation recognition signal CV-R on line 81, and decodes the subsequent four indicator bits of each delimiter. It furnishes respective output signals START, END, and ABEND on three signal lines 94 to control logic 89.

Control logic 89 furnishes timer control signals on lines 95 to timer 83, for adapting the timing signal sequence to the received information. Timer control signals include a CS frame indicator (for causing CS time slot signals after destination address), an END indicator, and an extension byte indicator.

Another output signal from control logic 89 is the switch control signal on line 69 to RIS, for causing either repetition of received data, or replacement of received data by local output data.

Several connections are provided between control logic 89 and the Data Terminal Unit DTU: A pair of lines 97 for a PS receive command and a CS receive command; a quadruple of lines 99 for transmit commands concerning either a PS data packet, a CS data block, a PS destination address, or a CS destination address; a single line 101 from the DTU to signal the end of a data packet or data block transmission; a pair of lines 103 to transfer PS send requests and CS send requests from the DTU; and a pair of lines 105 by which the DTU can notify the control logic of a received CS authorization, and of CS deauthorization. The three delimiter indicator lines 94 are also connected as lines 107 to the DTU, for signaling the end of a received data packet (when an end delimiter is received), or for signaling an abnormal end (ABEND) condition, and for signaling the beginning of a received frame (START).

An address compare unit 108 is connected by line 109 to one output of gating circuitry G1 (79) and to timing signal lines TS for receiving the destination address of each passing frame header. G1 is controlled by a pair of gating signals GT1 from control logic 89. One of these, GT1-1, is active during an interval when a destination address is received, and connects line 77 to line 109; the other, GT1-2, is active during the information field time of a frame and connects line 77 to a transfer line 110.

Address compare unit 108 has a second input which is connected to local address register 111 to furnish the local station address for comparison to unit 108. An output line 113 for an "own address received" signal connects compare unit 108 to control logic 89. In a similar way, a broadcast address can be recognized but no details are given here to simplify the description.

A serial/parallel converter unit and input buffer 115 are connected to G1 by line 110 for accepting received data from the information field of passing frames in bit-serial form. It converts these data to parallel bytes, and furnishes every eighth bit time one complete data byte on eight parallel lines 117 which are the DATA-IN lines for the DTU. Converter and buffer unit 115 is also connected to the three delimiter indicator lines 94 to prevent any transfer of buffer contents resulting from a received delimiter.

The eight parallel DATA-OUT lines 119 from the station are connected to gating circuitry G2 (121). A second input of G2 is connected to parallel transfer lines 122. Gating circuitry 121 is controlled by signals on a pair of gating control lines GT2 from control logic 89. One of these, GT2-1, is active during the destination address interval and the information field interval of a transmitted frame, and connects lines 119 to the input lines of a parallel-serial converter and output buffer 123; the other, GT2-2, connects line 122 to the input of converter and buffer 123.

Converter and buffer 123 accepts parallel addresses or data bytes from the DTU via G2, and furnishes them in bit-serial form on line 125, which is connected to a first input of gating circuitry G3 (127). Two other inputs of G3 are connected to a bit pattern generator 129 which furnishes continuously a stream of "1"-bits on one line, and a stream of "0"-bits on another line. Three gating control signal lines GT3 can transfer control signals from control signal 89 to G3. One of them, GT3-1, is active during destination address and information field intervals when the station transmits PS data or CS data, and when header control bytes or delimiters are read from ROS 135; it connects line 125 to line 131. The other two control signals GT3-2 and GT3-3, are activated for selectively providing a stream of "1"-bits or "0"-bits, respectively, from generator 129 to line 131.

A bit coder and code violation generator 133 has one input connected to line 131 to receive consecutive "0"-or "1"-bits. It converts each received single bit to a signal element pair (Manchester Code) in accordance with FIG. 2(a), and furnishes these signal element pairs to line 67 which is the DATA-OUT line connected to Ring Insert Switch RIS. A second input of unit 133 is connected to control logic 89 for receiving a control signal CV-T that is activated when a code violation for a delimiter is to be transmitted. This signal causes unit 133 to generate a code violation pattern as shown in FIG. 2(b) and to apply it during four consecutive bit periods to DATA-OUT line 67.

Ring Access Control Circuitry RAC also comprises a small read-only store 135 in which complete header control bytes are stored for transmission, and also delimiter bypass comprising four "0"-bits (to be over-written by the code violation) and four delimiter type indicator bits. ROS select signals can be transferred on parallel lines 137 for selecting the appropriate header control byte or delimiter byte as required for transmission. The selected byte will be furnished on lines 122 to gating circuitry G2 (121).

(B4) Details of CS Monitor Unit and Particularities in Associated Ring Access Control RAC As mentioned earlier, the CS Monitor Unit in present embodiment is a normal Data Terminal Unit with some additional circuitry for the CS Monitor functions. Only this additional circuitry will be described here in connection with FIG. 10.

It was assumed that the CS Monitor Unit itself will not transmit and receive periodic circuit-switched data, but only asynchronous packet-switched data. Thus, the respective CS control and data lines between CS Monitor Unit and RAC circuitry can be used for CS monitoring functions.

Functions peculiar to the RAC circuitry which is associated to the CS Monitor Unit will be described at the end of this section in connection with FIG. 9.

As shown in FIG. 10, CS Monitor control logic 139 is provided in the CS Monitor Unit. It mainly controls the receiving of CS authorization request and CS authorization release messages from other stations, the transmission of CS authorization Grant messages (or negative messages refusing authorization) to other stations, the updating of the number N(aut) of CS authorized stations, and the buffering of a CS frame header and part of the CS slot train after the first transmission around the ring (only in first embodiment). No detailed circuitry will be shown for this control circuitry because this could easily be implemented from the survey of functions and the sequences of operation steps given in the following.

The above mentioned messages for the CS authorization procedure, which are exchanged in normal PS frames between the respective station (to be authorized) and the CS monitor station, have the following formats:
(a) From normal station to CS monitor station:
CS authorization request message: The PS frame header contains the CS monitor address as destination address. The information field contains two bytes: a message type byte designating it as authorization request (see below), and an address byte identifying the requesting station. CS authorization release message: same contents as in authorization request, except that the message type designates it as authorization release (see below).
(b) From CS monitor station to normal station:
CS authorization grant message: The PS frame header contains the requesting station's address as destination address. The information field contains one byte as message type indicator, designating it as authorization grant message.
CS authorization refusal message: Same contents as in authorization grant, except that message type byte is different and designates it as an authorization refusal.
(c) Message type bytes used:

| | |
|---|---|
| 0000 0001 = | Authorization Request |
| 0000 0010 = | Authorization Release |
| 0000 0100 = | Authorization Grant |
| 0000 1000 = | Authorization Refusal |

The unused bits (e.g. leading 4 bits) in the message type bytes could be used to convey information on the CS bandwidth (e.g. number of CS slots) which is requested, granted, or released, respectively. This possibility is, however, not included in the presently disclosed embodiment. Other formats would be possible, of course. Authorization message frames could, e.g., have a priority bit (P2) in the framer header set to "1"; grant and refusal messages could carry the CS monitor station's address as a second byte in the information field, etc.

Connected to CS Monitor control logic 139, which will be shortly designated CSMCL 139 in the following, are timing and control lines from the associated RAC unit, namely timing signal lines (TS) 85, receive command lines 97, transmit command lines 99, packet end line 101, send request lines 103, and delimiter indicator lines 107. The CS monitor circuitry is connected to RAC also by DATA-IN lines 117 and DATA-OUT lines 119.

DATA-IN lines 117 are connected to a unit 145 called "CS Request/Release MTB Buffer and Recorder." By an appropriate "write message type byte (MTB)" control signal on line 147 from CSMCL 139, the message type byte of a CS request message or a CS release message, when received from another station, will be stored in the buffer and then decoded. As a result, either a "CS request" signal on line 149 or a "CS release" signal on line 151 will be transferred to CSMCL 139.

DATA-IN lines 117 are also connected to a unit 153 called "Requestor Address Buffer." A signal "write address" on line 155 from CSMCL 139 will be activated when the origin address in a request message is received, to collect that address in the buffer. The address can be released bytewise by a signal "read address" on line 157 from CSMCL 139.

DATA-OUT lines 119 are connected to the output of requestor address buffer 153, for transferring a stored requestor address as destination address in a CS authorization message when "read address" is activated.

DATA-OUT lines 119 are further connected to the output of a ROS 163 (or simply two read-only registers) which is provided for two standard CS authorization messages. Two different "read authorization message" signals on lines 165 will cause either an "Authorization Granted" message, or an "Authorization Refused" message to be furnished bytewise from ROS 163 to DATA-OUT lines 119 (for transfer to transmission ring 11).

The write control signals for message type byte and requestor address are developed as follows: When an authorization message is received, the signal on line 97 "Receive PS Data Packet" from RAC is activated. CSML 139 will then, in two consecutive byte intervals, activate the signals "write MTB" and "write address."

For transmitting an authorization message, CSMCL will activate the signal "PS send request" on a line 103. When a PS frame becomes available, the RAC will first activate the signal "transmit PS destination address" on lines 99, which will result in a signal "read address" on line 157, and then RAC will raise the signal "transmit PS data packet" on lines 99, which will result in a signal "read authorization message" on one of lines 165.

In the first embodiment of the invention, a "CS Slot Train Buffer" 167 will be provided for storing CS frame header and CS slots after the first round of a CS frame (until the CS frame end delimiter was transmitted and the CS frame header can be released for the second round). Its input is connected to DATA-IN lines 17. It will collect consecutively received bytes when a control signal "Write CS Slots" on line 169 from CSMCL 139 is active.

Both signals (read CS slots and write CS slots) are active in response to commands from the associated Ring Access Control RAC, as will be explained later in this section. An indicator line 172 is provided for transferring a signal "buffer empty" from buffer 167 to CSMCL 139.

A register 173 is provided for storing the currently authorized number N(aut) of stations which are allowed to use periodic circuit-switch frames according to the invention. The register contents, i.e. N(aut), is presented to CSMCL 139 by lines 175. Register contents may be either increased or decreased by a respective control signal from CSMCL. N(aut) can be reset to zero by a signal on line 177.

Another register 179 is provided for storing the maximum allowable number of authorized stations, N(max). A load input 181 can be provided for setting the value for N(max), e.g., manually.

Compare unit 183 is connected to both registers for comparing N(aut) and N(max), and for delivering a respective binary result signal, indicating i.e. either N(aut)<N(max) or N(aut)=N(max), to CSMCL on a respective indicator line.

A two-stage counter and comparator 185 is connected to register 173 for receiving the current number N(aut) on lines 187. The counter is started by a control signal from CSMCL 139 on line 189. When the information field, i.e., the CS slot train, of a CS frame starts (this is notified from RAC to CSMCL by a signal "Transmit CS data block" on lines 99), it is then advanced by each bit clock pulse (provided on lines TS) until it reaches the value N(train)=N(aut)×72, which is the number of bits required for a train of N(aut) CS-slots (9×8=72 bits each). When the number N(train) is reached, counter and comparator 185 issues a respective indicating signal on line 191 to CMSCL 139. This will cause a notifying signal on line 101 to the RAC so that this can terminate the CS slot train by an end delimiter.

As mentioned earlier, the Ring Access Control circuitry RAC which is associated to the CS Monitor Station has a few features that are different from those of RACs associated to normal stations.

As shown in FIG. 9, a CS interval timing generator 87 is additionally provided in connection with normal timer unit 83. This CS interval timing unit provides on its output line 88 the following timing signal for control logic 89: A signal "CS interval time" at regular intervals, e.g., every millisecond. The interval period of this signal may be fixed, or it may be selectable, e.g., manually by setting a switch or exchanging a circuit card of the CS interval timing unit.

Control logic 89 in this RAC has the following particulars:

After occurrence of signal "CS interval time" and when the next frame header is received, at "P1" bit time the switch control signal on line 69 and gate control signal GT3-3 are actuated, for changing the priority bit P1 in the passing frame header to "1".

When the next end delimiter occurs: Switch signal on line 69, ROS select signals on lines 137, and gating signals GT2-2/GT3-1 at first, then GT3-3 or GT3-2 are actuated to release a CS frame header (CS bit=1, TK bit=0) followed by idling "0"-bits (for embodiment 1: CS slot train) or followed by idling "1"-bits (for embodiment 2: sequence of individual CS frames).

Note: When the CS monitor station, after a pulse "CS interval time," sets the priority bit P1 in the next passing PS frame header, it usually has to wait until arrival of the end delimiter of the respective frame before it can release a CS frame header. A check will be made, however, by the CS monitor when it tries to set the priority bit in a PS frame header, whether TK=0, i.e., whether the frame is unused anyway. If this is true, the CS monitor station can immediately replace the PS frame header by a CS frame header (plus all subsequent transmission and switching operations for a CS frame as described below). This is possible because of the 1-byte data stream delay in the RAC of the CS monitor.

The subsequent events in control logic 89 depend on the type of embodiment:

In the first embodiment (slot train solution):

To obtain a given length slot train, the following is effected: The control logic sends a notifying signal to the CS Monitor Unit after the destination address field time, when the information field, i.e., the CS slot train, starts (e.g. over line "Transmit CS Data Block" in line group 99). CSMCL 139 (in FIG. 10) will start counter 185 as was explained above, and will return the counter end signal to the control logic in RAC (e.g. over line 101 "Packet End"). At this end of the CS slot train interval, the RAC control logic will cause transmission of an end delimiter from ROS 135 (followed by idling "1" bits if CS frame header was not received back yet).

When the CS frame header is received back first time, CS Monitor Control logic 139 is notified from RAC over line 97 "Receive CS Data Block" to start signal "write CS Slots," and gating signal GT1-2 is activated to open gate G1 for the header, destination address field, and CS slot train.

When the end delimiter of the CS slot train is transmitted, CS monitor control logic 139 is notified (after release of a start delimiter by RAC) over line 99 "Transmit CS data block" to start signal "read CS slots" (for second round), and gating signals GT2-1 and GT3-1 are activated to open gates G2 and G3 for data from DATA-OUT lines 119.

(a) If CS frame header is received back before transmission of end delimiter, no idling "1"s will be transmitted (because CS frame for second round will immediately follow end delimiter of CS frame in first round).

(b) If end delimiter is transmitted before CS frame header is received back, idling "1"s will be transmitted, but signals "write CS slots" and "read CS slots" will both not be activated (because no buffering in CS slot train buffer 167 will be necessary).

Instead, switch control signal on line 69 will be activated to repeat received data instead of transmitting idling "1"-bits as soon as start delimiter is received back the first time.

When CS frame header is received back the second time, control signals generated by control logic 89 will depend on present situation:

(a) If slot train was longer than loop delay and received signals are being read into slot train buffer: Monitor control logic is notified to stop signal "write CS slots" (by deactivating signal "Receive CS data Block").

CS slot train buffer read-out will continue, and when it is empty (after read-out of last slot of slot train), a signal on line 172 will cause CSMCL to stop the signal "read CS slots" for the buffer, and to send an end indicator signal over line 101 to the RAC. Thereupon, control signals are generated to transmit an end delimiter, a start delimiter and a normal PS frame header, followed by idling "1"s. When the end delimiter of the CS slot train is received, idling "1"s are stopped, and the switch control signal on line 69 is changed to repeat received data signals.

(b) If slot train was shorter than loop delay, and no buffering was effected (rather, received data were immediately repeated): Control signals are generated to replace CS frame header by normal PS frame header, followed by idling "1"-bits. When the end delimiter is received, the switch control signal is changed to repeat received data signals (instead of sending idling "1"-bits).

(2) In second embodiment (solution providing sequence of CS frames):

When start delimiter of CS frame is received back first time, control signals in RAC will cause a change of the switch control signal (line 69) to repeat received data signals.

When a CS frame header with a free token indication is received, control signals will be generated by RAC to replace the CS frame header by a normal PS frame header, followed by idling "1"-bits. When then a start delimiter is received (which precedes the PS frame header), the switch control signal in RAC will be changed to repeat (stopping transmission of idling "1"-bits).

(B5) Timing Signals Generated by Timer Unit

FIGS. 11A and 11B are diagrams showing the relation of the different timing signals TS which are generated by timer unit 83.

The timer unit receives on lines 73 and 81 the bit clock derived from the data stream, and a pulse when the code violation of the start delimiter is recognized. It further receives from control logic 89 on lines 95 the following control signals: (a) Header extension byte timing required; (b) End of data packet/data block; (c) CS frame received.

FIG. 11A shows the timing signals generated for each frame: A byte clock, header time (2 or 3 bytes), CS/P1/P2/TK/EX/MC/RS/RS (each one bit pulse within first byte of header), extension byte time (optional, 1 byte) destination address time (1 byte), information field time (variable length; starting with end of destination address, ending when end signal received from control logic). Destination address time, and the beginning of information field time will be shifted by one byte period if the header extension byte time signal is activated.

FIG. 11B shows additional timing signals for distinguishing fields in a CS slot train: Free/busy field time (1 bit pulse), destination address field time (1 byte minus leading bit), CS data block field time (8 bytes). These signals are repeated, and they are active for the same time periods as the information field time signal. They are only generated, however, when a CS frame header was received (notification from control logic on lines 95).

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. Method of transmitting information between stations attached to a unidirectional transmission ring, access to the ring for sending addressed information being given to stations, without frame synchronization, by a circulating frame header and a token indication, characterized in that for allowing both non-periodic transmission of asynchronously furnished data packets as well as periodic transmission of synchronously furnished data blocks:

a particularly marked frame header for circuit-switched transmission is released as CS frame header by a CS monitor station in periodic intervals, a CS frame header and a free token indication enable only previously authorized stations to send a block of synchronous data, a non-marked frame header with a free token indication, enabling any station to transmit directly over the said unidirectional transmission ring a packet of asynchronous data of arbitrary length is released by the CS monitor station as PS frame header after all blocks of synchronous data due to be sent within a periodic interval from authorized stations were transmitted.

2. Method in accordance with claim 1, characterized in that each CS frame header is followed by a given number of uniform CS slots, each CS slot comprising a token indication, an address field, and a data block field, the given number corresponds to the number of currently authorized stations, each authorized station seizes the first CS slot having a free token indication, converts it to non-token, and inserts the destination address and its data block into the respective fields, the CS monitor station releases a PS frame header with a free token indication to the ring after it received and retransmitted the CS frame including the given number of CS slots.

3. Method in accordance with claim 1, characterized in that in each frame header a particular CS priority indicator is provided;

the CS monitor station generates a CS interval time signal pulse in regular intervals, and sets the priority indicator in each first PS frame header that passes the station after a CS interval time signal pulse;

any station, when it had access to the ring and transmitted an asynchronous data packet, issues a new non-marked PS frame header with free token indication after receiving back a PS frame header in which the CS priority indicator was not set, but issues no new frame header and transmits only idling characters after receiving back a PS frame header in which the CS priority indicator was set.

4. Method in accordance with claim 2, characterized in that if a CS frame header is received back the first time by the CS monitor station before it transmitted an end delimiter for the same CS frame, the CS frame header and the contents of the following CS slots is buffered in the CS monitor station, the frame header, followed by CS slots, are released from the buffer to the ring for a second round after first transmission of the frame's end delimiter; and a new PS header with free token indication is released by the CS monitor unit when it transmitted the CS frame including an end delimiter a second time.

5. Method according to claim 1, characterized in that the CS interval time is an integer multiple of the period of the synchronous data to be transmitted, such that each CS data block contains a plurality of successive samples of the synchronous information.

6. Method according to claim 1, characterized in that the CS monitor station keeps a first number N(max) representing the maximum allowed number of authorized stations, and keeps a second number N(aut) representing the number of currently authorized stations;

any station that wants to transmit synchronous data in CS frames sends an authorization request to the CS monitor station;

the CS monitor station, for each received request, and if the second number is still less than the first number, sends an authorization grant message to the respective requesting station and updates the second number accordingly; and authorized stations utilize the transmission capacity in the regularly issued CS frames without any involvement of the CS monitor station.

7. Method of exchanging asynchronous data packets as well as synchronous data blocks in frames between stations attached to a unidirectional transmission ring, which includes for each said station the steps of:

recognizing a circulating frame header, testing a first control bit (TK) in said header, and setting said first control bit to a first binary value (1) if the station has an asynchronous data packet to be transmitted, and transmitting said data packet if said first control bit had a second binary value (0), and releasing a new frame header including a first control bit having said given first binary value;

characterized by the following additional steps:

in each said station testing a second control bit (P1) in said frame header, and preventing issuance of a new frame header after transmission of said data packet if said second control bit had a first binary value (1); and in a particular circuit-switch monitor station;

issuing a timing signal at periodic intervals, setting said second control bit to said first binary value in the next frame header received after each said periodic timing signal, and issuing a frame header in which a third control bit (CS) is set to a first binary value (1) after receiving a frame end delimiter.

8. A method of operating a serial data transmission ring which includes a plurality of stations operating at different class of service levels connected in series circuit with each other to form an endless series circuit ring in which data messages emanating from one station traverse the ring and are received in sequence by all of the stations on the ring including the originating station after the data message has passed through all of the other stations said method comprising the steps of:

generating a message frame which includes a header section having a first indicia (CS) for indicating more than one class of service level, a second indicia (P) for indicating more than one priority or reservation level and a third token indicia (TK) for indicating the state of occupancy of the frame said third token indicia being set at the time of generation to indicate availability of the frame said class of service indicia being set to a predetermined level and said priority or reservation indicia being set to a level corresponding to the predetermined class of service level, at a station requiring transmission capacity examining the header to determine the state of the class of service indicia creating a changed header by and the token indicia, changing the token indicia state, if available, to a not available state when the class of service level indicated by the said first indicia corresponds to the stations class and following the transmission of the said changed header transmitting a data message of variable length, at the said station examining the data received from the serial ring circuit for receipt of the header previously transmitted which has traversed all of the ring stations and issuing a frame header including a free token indicia if the priority or reservation indicia and the class of service indicia correspond.

9. The method set forth in claim 8 in which a station which has converted a token indicia from an available state to a non-available state removes from the ring circuit all of the data information inserted by that station and substitutes therefor synchronization signal elements.

10. The method set forth in claim 8 in which the header includes a fourth indicia (MC) which has at least two states and is placed in its first state by a station which has converted a token indicia from the available state to the unavailable state; and at one predetermined station, changing the fourth indicia from the first state to the second state and removing any received frame from the ring which has, as received, a fourth indicia in the said second state and generating and transmitting a message frame including a header having a token indicia in an available state.

11. The method set forth in claim 8 in which a predetermined station receiving a frame header section in which the class of service indicia and the priority or reservation indicia do not correspond issues a frame header having a class of service indicia corresponding to the received priority or reservation indicia and a priority or reservation indicia corresponding to the above said predetermined class of service indicia.

* * * * *